W. J. RYAN.
SAFETY FASTENER.
APPLICATION FILED MAY 27, 1919. RENEWED JUNE 30, 1922.
1,432,039.
Patented Oct. 17, 1922.
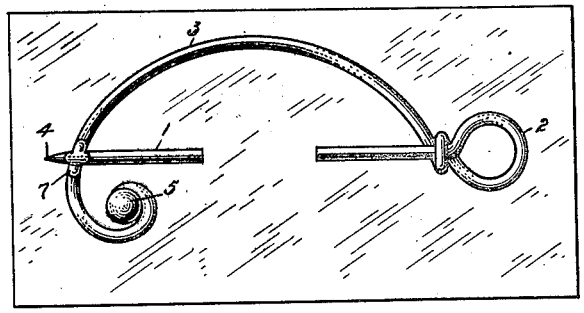
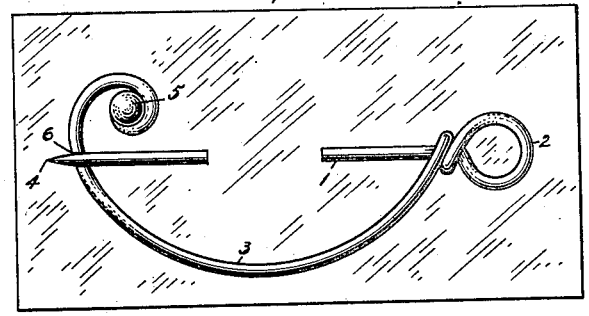
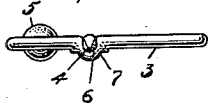
Inventor,
William J. Ryan
By C. J. Fetherstonhaugh.
Atty.

Patented Oct. 17, 1922.

1,432,039

UNITED STATES PATENT OFFICE.

WILLIAM JOHN RYAN, OF TORONTO, ONTARIO, CANADA.

SAFETY FASTENER.

Application filed May 27, 1919, Serial No. 300,155. Renewed June 30, 1922. Serial No. 572,024.

*To all whom it may concern:*

Be it known that I, WILLIAM JOHN RYAN, a subject of the King of Great Britain, and resident of 24 King Street West, in the city of Toronto, county of York, Province of Ontario, Dominion of Canada, have invented certain new and useful Improvements in Safety Fasteners, of which the following is a specification.

The invention relates to improvements in safety fasteners as described in the present specification and shown in the accompanying drawings that form a part of the same.

The invention consists essentially of the novel features of construction whereby a pin is provided with a keeper formed to permit of the pin being readily projected through an object and when said pin is inverted constituting a means for preventing the withdrawal thereof.

The objects of the invention are to provide a safety fastener which may be easily secured with one hand, and generally to provide a safety fastener which will be cheap to manufacture, durable and efficient.

In the drawings, Figure 1 is a view showing the pin projected through a piece of fabric prior to being inverted to prevent withdrawal.

Figure 2 shows the fastener as it appears when secured to the fabric.

Figure 3 is an end view of the fastener.

Like numerals of reference indicate corresponding parts in the various figures.

Referring to the drawings the fastener is preferably formed from a single piece of material and comprises a straight portion 1 forming the pin proper, a handle portion 2 formed by looping the material around the end of said pin, and a keeper 3 formed by continuing said material from said handle in substantially arch shape and crossing the pointed end 4 of said pin at substantially right angles thereto and having its end curled inwardly towards said pin and terminating in an enlarged portion 5 formed either by shaping the surplus material or by securing a ball or other device to the end of said material.

It will of course be understood that while it would appear to be advantageous to construct the fastener from a single piece of material this might be impractical when utilizing certain materials in which case it might be necessary that the pin, handle and keeper be constructed separately and assembled by any desired means.

The keeper 3 is preferably offset or slotted transversely at the point where it crosses the pin, as indicated by the numeral 6, for the reception of said pin, thus providing a means for holding said pin and said keeper to their proper positions in relation to one another.

In cases where the keeper is slotted it might be advisable to reinforce the top side thereof above said slot by the application of solder, as indicated by the numeral 7, or by any other desired means.

In the use of this invention the fastener is held by means of the handle 2 with the keeper 3 outermost and the pin is then projected through the fabric in the manner in which an ordinary pin is employed the ball portion 5 during the operation of inserting the pin coming into contact with the fabric and serving to separate the pin and the keeper to permit of the said fabric passing said keeper. The fastener is then inverted by simply turning over the handle portion to the position illustrated in Figure 3 thus effectually locking the pin to the fabric as the keeper is then positioned between the pin and the fabric and prevents the withdrawal of said pin. To detach the pin it is simply necessary to turn the handle portion over to its original position and pull outwardly thereon.

What I claim is:

A safety fastener comprising a pin proper, and a keeper secured to the head end thereof and extending backwardly in substantially arch shape and crossing said pin adjacent to the point thereof and terminating in a ball end, adapted in the process of insertion to space said point from said keeper.

Signed at the city of Toronto, Ontario, this 9th day of May, 1919.

WILLIAM JOHN RYAN.

Witnesses:
W. G. HAMMOND,
M. HAMMOND.